United States Patent [19]

Macasaet

[11] Patent Number: 5,390,787
[45] Date of Patent: Feb. 21, 1995

[54] PORTABLE COMPACT DISC STORAGE APPARATUS

[76] Inventor: David W. Macasaet, 303 Sherry La., Viroqua, Wis. 54665

[21] Appl. No.: 199,533

[22] Filed: Feb. 22, 1994

[51] Int. Cl.$^6$ ............................................. B65D 85/57
[52] U.S. Cl. ................... 206/309; 206/308.1; 190/101; 190/112; 312/9.64; 220/524; 220/526
[58] Field of Search ..................... 206/309, 387; 217/7; 150/102; 190/101, 111, 112; 220/524, 526; 312/9.8, 9.64

[56] References Cited

U.S. PATENT DOCUMENTS

| D. 320,128 | 9/1991 | Fithian . | |
| 701,309 | 6/1902 | Deitsch | 217/7 |
| 1,643,189 | 9/1927 | Urovsky | 190/101 |
| 2,695,112 | 11/1954 | Bonnevay | 217/7 |
| 3,710,900 | 1/1973 | Fink | 312/9.54 |
| 4,084,865 | 4/1978 | Joyce | 206/387 |
| 4,452,390 | 6/1984 | West . | |
| 4,842,032 | 6/1989 | Mastronardo . | |
| 4,889,244 | 12/1989 | Hehn et al. . | |
| 5,051,725 | 9/1991 | Caccitolo . | |
| 5,238,112 | 8/1993 | Massey et al. | 206/387 |

FOREIGN PATENT DOCUMENTS

| 2428889 | 2/1980 | France | 206/387 |
| 3105467 | 9/1982 | Germany | 190/101 |
| 1601673 | 11/1981 | United Kingdom | 206/387 |

*Primary Examiner*—William I. Price

[57] ABSTRACT

A new and improved portable, recorded media storage apparatus includes a housing assembly and a plurality of recorded media retention assemblies supported by and retained in the housing assembly. The recorded media retention assemblies are arrayed with the housing assembly in parallel rows and columns. A door assembly includes an interior side and an exterior side, and a flexible, resilient panel is attached to the interior side of the door assembly. A hinge assembly connects the door assembly to the housing assembly. An auxiliary storage chamber assembly is supported by and retained in the housing assembly. The auxiliary storage chamber assembly includes an auxiliary chamber housing, an auxiliary chamber door, and an auxiliary hinge assembly for connecting the auxiliary chamber door to the auxiliary chamber housing. A door lock assembly is used for selectively locking the door assembly to the housing assembly. An auxiliary door lock assembly is used for locking the auxiliary chamber door onto the auxiliary chamber housing. A location fixing assembly is provided and is adapted to fix the housing assembly to a selected location. The location fixing assembly includes a cable connected to the housing assembly and to a fixed object at the location.

12 Claims, 2 Drawing Sheets

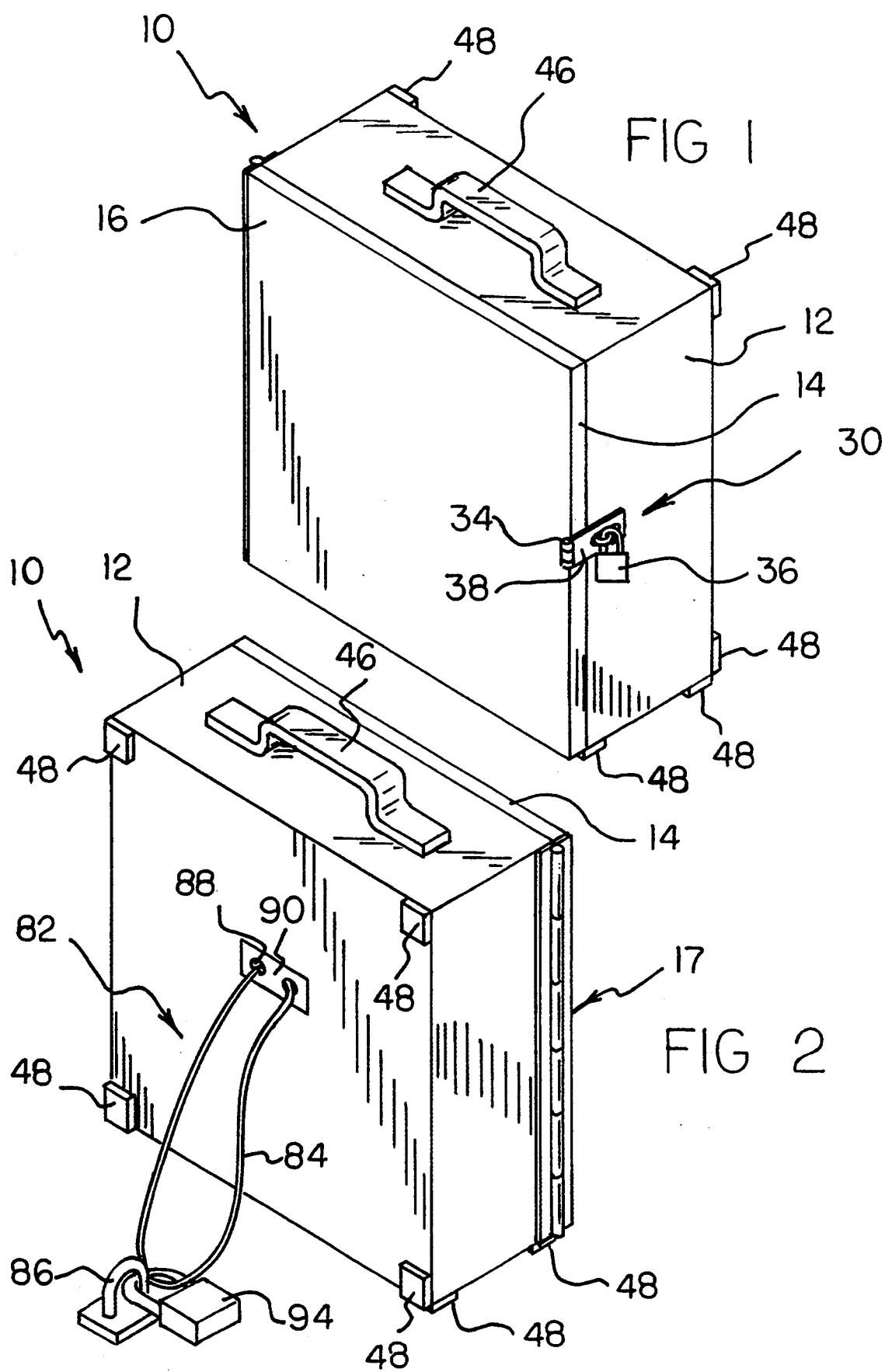

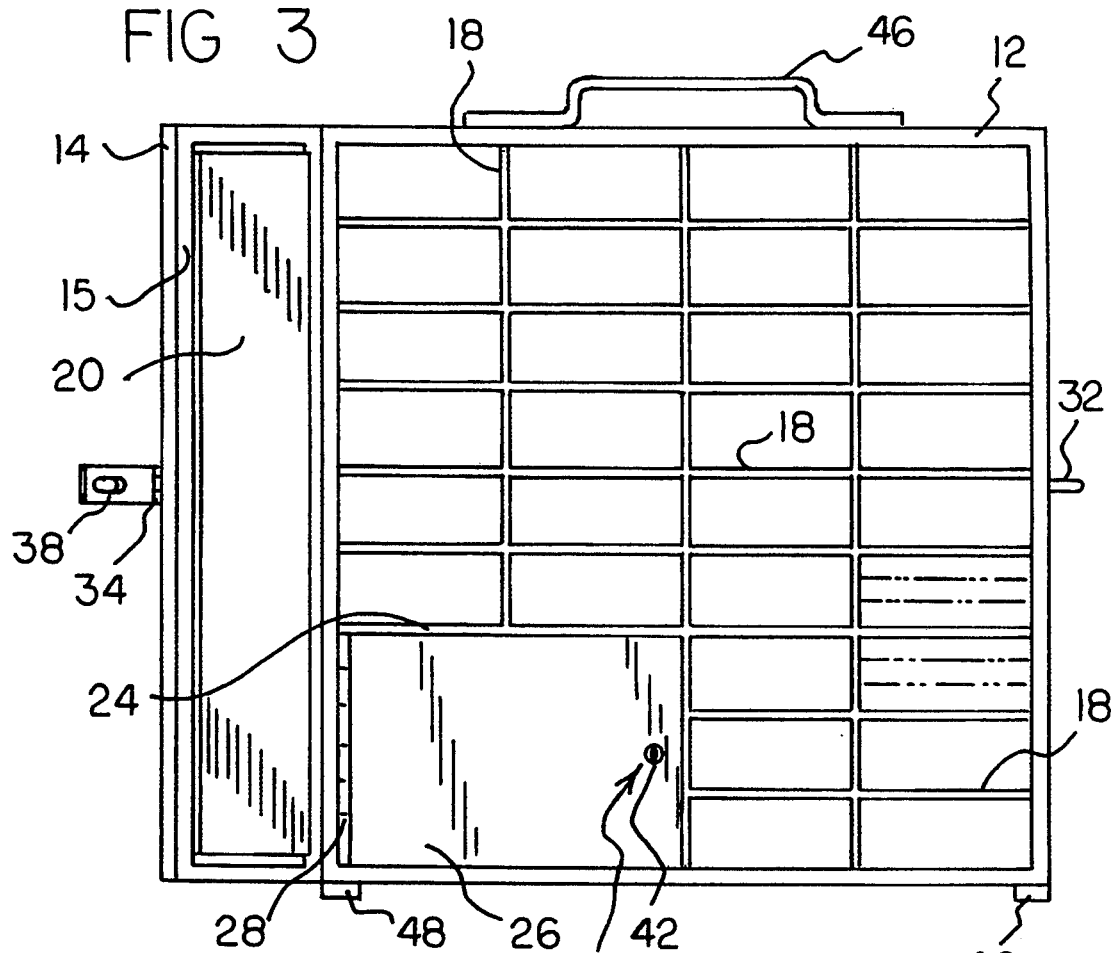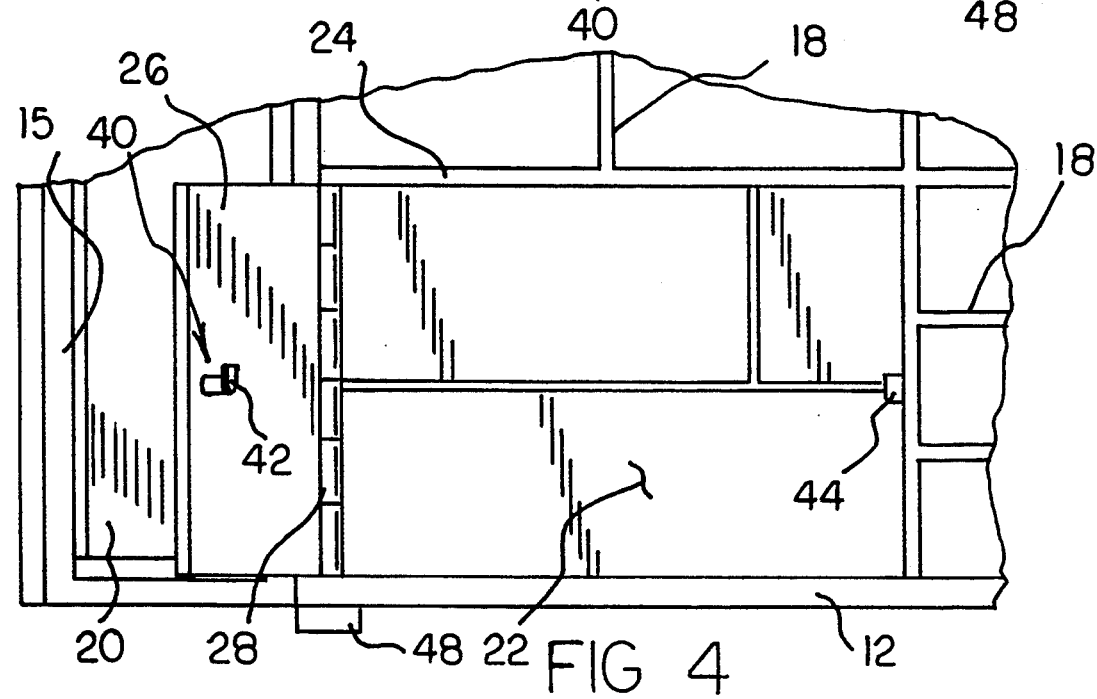

PORTABLE COMPACT DISC STORAGE APPARATUS

BACKGROUND OF THE INVENTION

1. Field of the Invention

The present invention relates generally to portable storage devices and carrying cases and, more particularly, to a portable storage device and carrying case especially adapted for storing and carrying compact discs.

2. Description of the Prior Art

A compact disc (CD) is a popular medium for recording music and information. Generally, compact discs are relatively expensive compared to cassette tapes, and large collections of compact discs are quite valuable. Portable storage containers exist for compact discs. However, to provide security for stored compact discs, it would be desirable if a compact disc storage container had a door and a lock for securing the door. Moreover, to prevent unauthorized carrying off of a storage container, it would be desirable if a storage container for compact discs were provided which can be secured to a specific location.

A storage container for compact discs generally includes specific portions designed to receive the compact discs. Yet, the compact discs generally do not fit very tightly in the CD receiving portions. As a result, when the storage container is carried, the compact discs may rattle during transport. In this respect, it would be desirable if a compact disc carrying case were provided which had provisions for precluding rattling of compact discs during transport in the carrying case.

When a person employs a storage and carrying case for compact discs, the person often desires to carry additional items in the carrying case along with the compact discs. In this respect, it would be desirable if a compact disc carrying case included an internal storage area for storing items other than compact discs. Moreover, it would be desirable if the internal storage area included its own lock for securing items stored therein.

Throughout the years, a number of innovations have been developed relating to portable storage containers, and the following U.S. patents are representative of some of those innovations: U.S. Pat. Nos. 4,452,390; 4,842,032; 4,889,244; 5,051,725; and U.S. Pat. Des. No. 320,128.

More specifically, U.S. Pat. Nos. 4,452,390 and 5,051,725 disclose respective portable security containers that have a lock and key. However, no provision is made for retaining the stored items in special holders for keeping the stored items in an ordered, organized manner. In this respect, it would be desirable if a storage container that has a lock and key has provisions for retaining stored compact discs in an ordered, organized manner.

U.S. Pat. Nos. 4,842,032, 4,889,244, and U.S. Pat. Des. No. 320,128 disclose respective compact disc storage cases that have no provisions for securing the compact discs. Moreover, none of these devices have devices for preventing the stored compact discs from rattling.

Thus, while the foregoing body of prior art indicates it to be well known to use portable storage containers for storing compact discs, the prior art described above does not teach or suggest a portable compact disc storage apparatus which has the following combination of desirable features: (1) has a door and a lock for securing the door; (2) can be secured to a specific location; (3) has provisions for precluding rattling of compact discs during transport in the carrying case; (4) includes an internal storage area for storing items other than compact discs; (5) the internal storage area includes its own lock for securing items stored therein; and (7) has provisions for retaining stored compact discs in an ordered, organized manner. The foregoing desired characteristics are provided by the unique portable compact disc storage apparatus of the present invention as will be made apparent from the following description thereof. Other advantages of the present invention over the prior art also will be rendered evident. For example, the present invention can also be used for storing recorded media generally, not just compact discs. More specifically, an appropriately dimensioned embodiment of the apparatus of the present invention can also be used for storing audio and video tapes of different size.

SUMMARY OF THE INVENTION

To achieve the foregoing and other advantages, the present invention, briefly described, provides a new and improved portable, recorded media storage apparatus includes a housing assembly and a plurality of recorded media retention assemblies supported by and retained in the housing assembly. The recorded media retention assemblies are arrayed with the housing assembly in parallel rows and columns. A door assembly includes an interior side and an exterior side, and a flexible, resilient panel is attached to the interior side of the door assembly. A hinge assembly connects the door assembly to the housing assembly.

An auxiliary storage chamber assembly is supported by and retained in the housing assembly. The auxiliary storage chamber assembly includes an auxiliary chamber housing, an auxiliary chamber door, and an auxiliary hinge assembly for connecting the auxiliary chamber door to the auxiliary chamber housing. A door lock assembly is used for selectively locking the door assembly to the housing assembly.

The door lock assembly includes a hasp assembly which includes a staple assembly that is attached to the housing assembly. A hasp hinge assembly is attached to the exterior side of the door assembly, and a slotted hasp plate is attached to the hasp hinge assembly. An auxiliary door lock assembly is used for locking the auxiliary chamber door onto the auxiliary chamber housing. The auxiliary door lock assembly includes a key-operated latch assembly attached to the auxiliary chamber door, and a catch is connected to the auxiliary chamber housing.

The housing assembly includes a handle assembly attached to one side of the housing assembly. A plurality of feet are attached to the housing assembly for supporting the housing assembly on a support surface. A location fixing assembly is provided and is adapted to fix the housing assembly to a selected location. The location fixing assembly includes a cable connected to the housing assembly and to a fixed object at the location. The fixed object is a U-shaped fixture fixed to a floor.

The housing assembly includes a plurality of apertures through which the cable passes. An apertured reinforcement plate is attached by the housing assembly and is placed in registration with the apertures.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved portable compact disc storage apparatus which has all of the advantages of the prior art and none of the disadvantages.

It is another object of the present invention to provide a new and improved portable compact disc storage apparatus which may be easily and efficiently manufactured and marketed.

It is a further object of the present invention to provide a new and improved portable compact disc storage apparatus which is of durable and reliable construction.

An even further object of the present invention is to provide a new and improved portable compact disc storage apparatus which is susceptible of a low cost of manufacture with regard to both materials and labor, and which accordingly is then susceptible of low prices of sale to the consuming public, thereby making such portable compact disc storage apparatus available to the buying public.

Still yet a further object of the present invention is to provide a new and improved portable compact disc storage apparatus which has a door and a lock for securing the door.

Still another object of the present invention is to provide a new and improved portable compact disc storage apparatus that can be secured to a specific location.

Yet a further object of the present invention is to provide a new and improved portable compact disc storage apparatus which has provisions for precluding rattling of compact discs during transport in the carrying case.

Even another object of the present invention is to provide a new and improved portable compact disc storage apparatus that includes an internal storage area for storing items other than compact discs.

Still a further object of the present invention is to provide a new and improved portable compact disc storage apparatus which the internal storage area includes its own lock for securing items stored therein.

Yet another object of the present invention is to provide a new and improved portable compact disc storage apparatus that has provisions for retaining stored compact discs or other recorded media in an ordered, organized manner.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a front perspective view showing a first preferred embodiment of the portable compact disc storage apparatus of the invention.

FIG. 2 is a rear perspective view of the embodiment of the portable compact disc storage apparatus shown in FIG. 1.

FIG. 3 is an enlarged frontal view of the embodiment of the invention shown in FIG. 1 with the door swung open.

FIG. 4 is an enlarged partial frontal view of the internal, lockable storage box shown in FIG. 4 with its door swung open.

DESCRIPTION OF THE PREFERRED EMBODIMENT

With reference to the drawings, a new and improved portable compact disc storage apparatus embodying the principles and concepts of the present invention will be described.

Turning initially to FIGS. 1-4, there is shown a first exemplary embodiment of the portable compact disc storage apparatus of the invention generally designated by reference numeral 10. In its preferred form, portable compact disc storage apparatus 10 includes a housing assembly 12 and a plurality of recorded media retention assemblies 18 supported by and retained in the housing assembly 12. A door assembly 14 includes an interior side 15 and an exterior side 16, and a flexible, resilient panel 20 is attached to the interior side 15 of the door assembly 14. A hinge assembly 17 connects the door assembly 14 to the housing assembly 12.

An auxiliary storage chamber assembly 22 is supported by and retained in the housing assembly 12. The auxiliary storage chamber assembly 22 includes an auxiliary chamber housing 24, an auxiliary chamber door 26, and an auxiliary hinge assembly 28 for connecting the auxiliary chamber door 26 to the auxiliary chamber housing 24. A door lock assembly 30 is used for selectively locking the door assembly 14 to the housing assembly 12.

In use, when the door assembly 14 is closed, the flexible, resilient panel 20 presses up against compact discs stored in the recorded media retention assemblies 18. As a result, the compact discs are prevented from rattling when the portable compact disc storage apparatus is transported. The recorded media retention assemblies 18 are arrayed with the housing assembly 12 in parallel rows and columns.

The door lock assembly 30 includes a hasp assembly which includes a staple assembly 32 that is attached to the housing assembly 12. A hasp hinge assembly 34 is attached to the exterior side 16 of the door assembly 14, and a slotted hasp plate 38 is attached to the hasp hinge assembly 34. In addition, a padlock 36 is fixed around the staple assembly 32 after the slotted hasp plate 38 has been placed over the staple assembly 32. Auxiliary door lock assembly 40 is used for locking the auxiliary chamber door 26 onto the auxiliary chamber housing 24. The auxiliary door lock assembly 40 includes a key-operated latch assembly 42 attached to the auxiliary chamber door 26, and a catch 44 is connected to the auxiliary chamber housing 24.

The housing assembly 12 includes a handle assembly 46 attached to one side of the housing assembly 12. A plurality of feet 48 are attached to the housing assembly 12 for supporting the housing assembly 12 on a support surface. The support surface can be any suitable horizontal surface such as a table or floor.

A location fixing assembly 82 is provided and is adapted to fix the housing assembly 12 to a selected location. The location fixing assembly 82 includes a cable 84 connected to the housing assembly 12 and to a fixed object 86 at the location. The fixed object 86 is a U-shaped fixture 86 fixed to a floor. A padlock 94 is used to secure the cable 84 to the U-shaped fixture 86 on the floor.

The housing assembly 12 includes a plurality of apertures 88 through which the cable 84 passes. An apertured reinforcement plate 90 is attached by the housing assembly 12 and is placed in registration with the apertures 88. The apertured reinforcement plate 90 serves to reinforce the apertures 88 in the wall of the housing assembly 12.

The components of the portable compact disc storage apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved portable compact disc storage apparatus that is low in cost, relatively simple in design and operation, and which may advantageously be used to enclose and secure compact discs. With the invention, a portable compact disc storage apparatus is provided which can be secured to a specific location. With the invention, a portable compact disc storage apparatus is provided which has provisions for precluding rattling of compact discs during transport in the carrying ease. With the invention, a portable compact disc storage apparatus is provided which includes an internal storage area for storing items other than compact discs. With the invention, a portable compact disc storage apparatus is provided which the internal storage area includes its own lock for securing items stored therein.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved portable, recorded media storage apparatus, comprising:
   a housing assembly,
   a plurality of recorded media retention assemblies supported by and retained in said housing assembly,
   a door assembly including an interior side and an exterior side,
   a flexible, resilient panel attached to said interior side of said door assembly,
   a hinge assembly for connecting said door assembly to said housing assembly,
   an auxiliary storage chamber assembly supported by and retained in said housing assembly, said auxiliary storage chamber assembly including an auxiliary chamber housing, an auxiliary chamber door, and an auxiliary hinge assembly for connecting said auxiliary chamber door to said auxiliary chamber housing, and
   a door lock assembly for selectively locking said door assembly to said housing assembly.

2. The apparatus described in claim 1 wherein said recorded media retention assemblies are arrayed with said housing assembly in parallel rows and columns.

3. The apparatus described in claim 1 wherein said door lock assembly includes a hasp assembly which includes:
   a staple assembly attached to said housing assembly,
   a hasp hinge assembly attached to said exterior side of said door assembly, and
   a slotted hasp plate attached to said hasp hinge assembly.

4. The apparatus described in claim 1, further including:
   an auxiliary door lock assembly for locking said auxiliary chamber door onto said auxiliary chamber housing.

5. The apparatus described in claim 4 wherein said auxiliary door lock assembly includes:
   a key-operated latch assembly attached to said auxiliary chamber door, and
   a catch connected to said auxiliary chamber housing.

6. The apparatus described in claim 1 wherein said housing assembly includes a handle assembly attached to one side of said housing assembly.

7. The apparatus described in claim 1, further including:
   a plurality of feet attached to said housing assembly for supporting said housing assembly on a support surface.

8. The apparatus described in claim 1, further including:
   a location fixing assembly adapted to fix said housing assembly to a selected location.

9. The apparatus described in claim 8 wherein said location fixing assembly includes:
   a cable connected to said housing assembly and to a fixed object at the location.

10. The apparatus described in claim 9 wherein said fixed object is a U-shaped fixture fixed to a floor.

11. The apparatus described in claim 8 wherein said housing assembly includes a plurality of apertures through which said cable passes.

12. The apparatus described in claim 11, further including:
   an apertured reinforcement plate supported by said housing assembly and placed in registration with said apertures.

* * * * *